(12) United States Patent
Irvin et al.

(10) Patent No.: US 7,557,220 B1
(45) Date of Patent: Jul. 7, 2009

(54) TETRAZOLE BASED LINEAR POLYMERS

(75) Inventors: David J. Irvin, Ridgecrest, CA (US); Mark H. Mason, Inyokern, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 500 days.

(21) Appl. No.: 11/151,192

(22) Filed: May 27, 2005

(51) Int. Cl.
C07D 257/04 (2006.01)
C07D 403/06 (2006.01)

(52) U.S. Cl. .................................................. 548/254

(58) Field of Classification Search .................. 548/254
See application file for complete search history.

(56) References Cited

U.S. PATENT DOCUMENTS 5,053,086 A * 10/1991 Henry et al. ................ 149/19.4

* cited by examiner

*Primary Examiner*—Rebecca L Anderson
*Assistant Examiner*—Shawquia Young
(74) *Attorney, Agent, or Firm*—Brian F. Drazich; Charlene A. Haley

(57) ABSTRACT

A linear isocyanate polymer produced by utilizing an effective amount of tetrazole diol or tetrazole polyol, reacting with an effective amount isocyanate resin, and cooling to room temperature producing a linear polyisocyanate polymer.

8 Claims, No Drawings

TETRAZOLE BASED LINEAR POLYMERS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

There is a need for novel energetic binders to increase the performance of pyrotechnics, gun propellants, rocket propellants, air-bag gas generator propellants, and explosives. Depending on the application, these materials are typically 3-25% binder by mass. Therefore, improvements to the energy content, mechanical properties, or insensitive munitions properties of the polymeric binder can have significant affects on the performance of the energetic material in question.

In general many pyrotechnics, propellants, explosives are comprised of a polymeric binder that holds one or more energetic solids in a plastic matrix. The polymeric binder serves many roles in these materials. Initially the polymer can aid in processing. In fact, the properties of the polymer will significantly affect how a material is processed, whether it is cast or pressed or extruded. Furthermore, the polymer mechanically holds all the ingredients together, serving as a structural element literally binding together the final material. This role is especially critical in rocket propellants, because cracks and voids in the propellant will lead to motor grain failure, often with catastrophic results. The binder serves many safety functions. The binder physically coats the energetic solids in these materials, this provides a physical buffer to minimize the physical and chemical interaction of reactive solids with each other. This generally lowers the electrostatic discharge, impact, and friction sensitivity of the final material. In some materials, especially rocket propellants, the binder also serves as a fuel when the hydrocarbon polymer is combusted by the oxidizer. However, the binder generally diminishes the performance (detonation pressure and velocity) of most explosives. To improve the performance of explosives with significant binder content, and to increase the energy density of propellants energetic polymers are needed.

While there are energetic binders available (polyglycidyl nitrate (PGN), polyglycidyl azide (GAP), azidomethyl-methyl-oxetane (AMMO), bis((azido-methyl)oxetane) (BAMMO), nitratomethyl-methyloxetane (NMMO), etc.) the safety benefits of increasing binder content are lost because these materials contain either organic azides or nitrate esters (or both). These functional groups are chemically unstable, easily ignited, and generally create reactive fragments on aging. In fact, propellants that utilize nitrate esters generally require expensive monitoring programs throughout their life cycle to insure both adequate safety properties and performance as the propellant ages. The cost of such monitoring is often cited as one reason most modern explosives do not to use nitrate esters as binder materials. Furthermore, the energetic groups are pendant moieties attached to the polymer, but not incorporated into the polymer backbone. This impairs the physical properties of these polymers and causes the formulator to need a higher weight percent of binder in order to achieve adequate coating. In short, there is a need for improved energetic binders to address safety, performance, aging, and processing requirements.

While tetrazoles are somewhat less energetic than azides or nitrates, the bis-alkyltetrazoles of interest are more thermally stable and substantially less chemically reactive. Higher percentages of these binders could be used without anticipating negative safety consequences. Furthermore, the energetic functionality is built into the polymer backbone, minimizing the total moles of pendant atoms. This is anticipated to yield a binder with superior physical properties. A dihydroxy-terminated bis-tetrazole (2,2Bis((2-ethanol)-1 or 2H-tetrazole)-propane or BETP) has been synthesized on the multigram scale. Initial differential scanning calorimetery (DSC) analysis shows this pre-polymer has promise as an energetic cured urethane binder for explosives and propellants and gas generates.

U.S. Pat. No. 5,053,086 issued on Oct. 1, 1991 to Henry, et al., which teaches gas generating compositions containing energetic high nitrogen such as ammonium 5-nitraminotetrazole and 5,5'-bitetrazole. This work yielded polymeric binders that are too rigid and "glassy" for the intended application. The chemical structure of the present invention polymers builds more flexibility into the backbone, yielding improved elastomers. Further research by Demko teaches the addition of sodium azide to nitrites to give 1H-tetrazoles in water with zinc salts as catalysts. (Demko, Z. P.; Sharpless, K. B. "Preparation of 5-substituted 1H-tetrazoles from nitrites in water." *J. Org. Chem.* 2001, 66, 7945). This step is only one method to obtain the tetrazole intermediate. Further reaction is necessary to produce the alcohol-based monomers. The addition of the alkyl alcohol is two fold: first, the short alkyl chain adds flexibility, solubility; second, the alcohol group allows for the production of stable polyurethanes. Polymerization of the tetrazole would produce the less stable polyurea.

Tetrazole compounds have application in many fields including, but not limited to, chemistry, ligands, metabolically stable surrogate for a carboxylic acid group, and material sciences including explosives and propellants and air bag gas generators.

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments and in the appended claims.

DETAILED DESCRIPTION OF THE INVENTION

Embodiments of the present invention generally relate to a polymer having the general structure (I) comprising: wherein [p] is a value of about 5 to 10,000; wherein [X] comprises at least

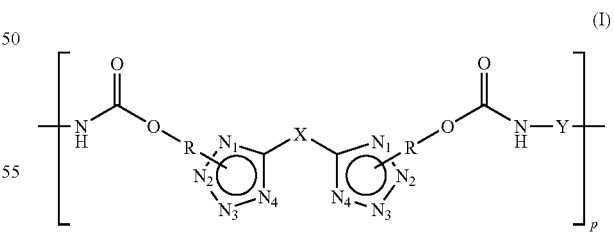

one group of alkyls, aryls, and oligoethers; wherein [R] comprises at least one group of alkyls, aryls, and oligoethers, wherein [R] is chemically bonded to $N_1$ or $N_2$ position; and wherein [Y] comprises at least one group of alkyls, aryls, and oligoethers.

Further embodiments of the present invention include a polymer having the general structure (I) comprising: an effective amount of tetrazole diol having the general structure (II)

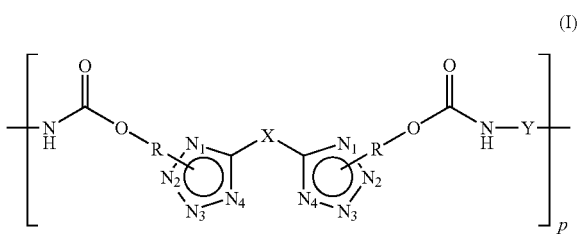

(I)

reacting with an effective amount isocyanate resin at a temperature in the range of about 50° C. to about 150° C. for a time period in the range of about 1 to 24 hours, wherein [X] comprises at least one group of alkyls, aryls, and oligoethers, wherein [R] comprises at least one group of alkyls, aryls, and oligoethers, wherein [R] is chemically bonded to $N_1$ or $N_2$ position; wherein the isocyanate

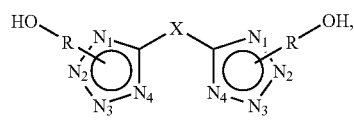

(II)

tetrazole diol resin having the general structure (III), wherein [Y] comprises at least one group of alkyls, aryls, and oligoethers, cooling to room temperature producing a linear polyisocyanate polymer; and the linear polyisocyanate polymer having the general structure (I), wherein [X] comprises at least one

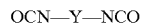 (III), group of alkyls, aryls, and oligoethers, wherein [Y] comprises at least one group of alkyls, aryls, and oligoethers, wherein [p] is about 5 to about 10,000, wherein [R] comprises at least one group of alkyls, aryls, and oligoethers, wherein [R] is chemically bonded to $N_1$ or $N_2$ positioned of the linear polyisocyanate polymer (I).

In other embodiments, [p] of the linear isocyanate polymer is about 5 to about 1,000. Although all embodiments of the present invention include any combinations of [R], [X] and [Y], the following are examples of some genus and species embodiments. The [R], [X] and [Y] of the linear polyisocyanate polymers (I), (V), and (VII), include any combination thereof:

-continued
| R | x | Y |
|---|---|---|
| 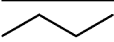 | 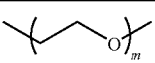 | 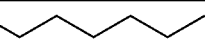 |
| 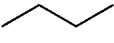 | 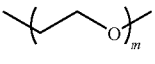 | 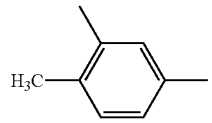 |
| 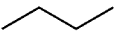 | 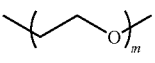 | 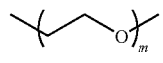 |
| 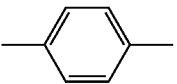 | 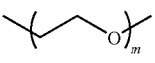 | 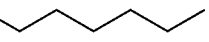 |
| 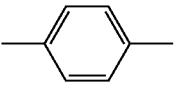 | 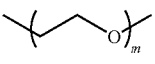 | 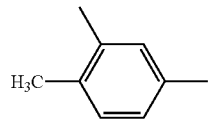 |
| 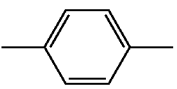 | 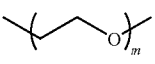 | 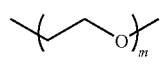 |
| 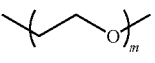 | 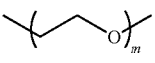 | 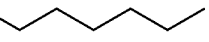 |
| 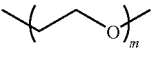 | 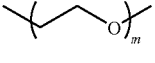 | 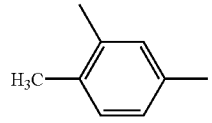 |
| 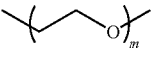 | 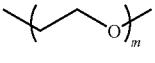 | 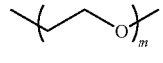 |
| 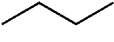 | 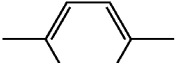 | 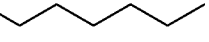 |
| 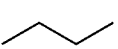 | 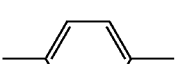 | 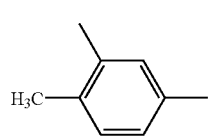 |
| 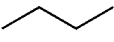 | 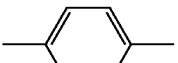 |  |
| 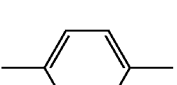 | 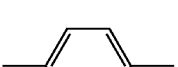 |  |
| 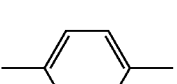 | 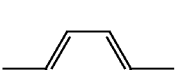 | 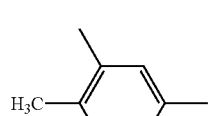 |
| 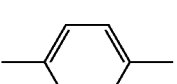 | 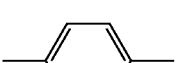 | 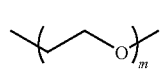 |

-continued

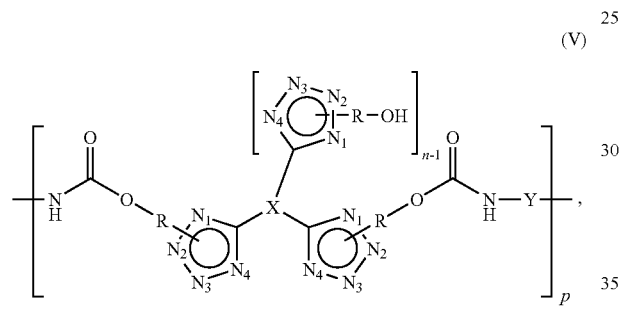

Yet other embodiments of the present invention include a polymer having the general structure (V) comprising: wherein [p] is a value of about 5 to about 10,000; wherein [n] is a value

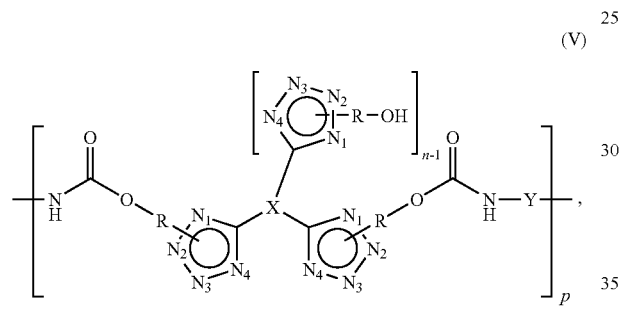

of 2 to 9; wherein [X] comprises at least one group of alkyls, aryls, and oligoethers; wherein [R] comprises at least one group of alkyls, aryls, and oligoethers, wherein [R] is chemically bonded to $N_1$ or $N_2$ position; and wherein [Y] comprises at least one group of alkyls, aryls, and oligoethers.

Still yet other embodiments of the present invention include a polymer having the general structure (V) comprising: an effective amount of tetrazole polyol having the general structure (VI)

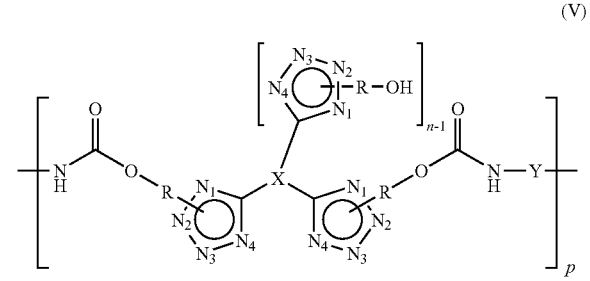

reacting with isocyanate resin at a temperature in the range of about 50° C. to about 100° C. for a time period in the range of about 1 to about 48 hours, wherein [X] of the tetrazole polyol comprises at least one group of alkyls, aryls, and oligoethers, wherein [n] is 2 to 9, wherein [R] comprises at least one group of alkyls, aryls, and oligoethers, wherein [R] is chemically bonded to $N_1$ or $N_2$ position; wherein the isocyanate resin having the general structure (III), wherein [Y] comprises at

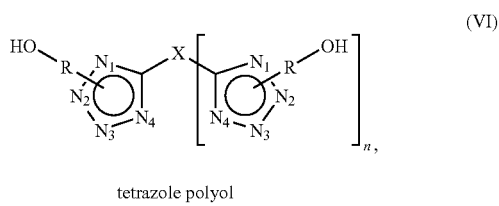

tetrazole polyol least one group of alkyls, aryls, and oligoethers, cooling to room temperature producing a linear polyisocyanate polymer; and said linear polyisocyanate polymer having the general structure (V),

OCN—Y—NCO         (III), wherein [X] comprises at least one group of alkyls, aryls, and oligoethers, wherein [n] is 2 to 9, wherein [p] is about 5 to about 10,000, wherein [Y] comprises at least one group of alkyls, aryls, and oligoethers, wherein [R] comprises at least one group of alkyls, aryls, and oligoethers, wherein [R] is chemically bonded to $N_1$ or $N_2$ position of the linear polyisocyanate polymer (V).

Further embodiments of the present invention include combining at least one catalyst and filler together with the tetrazole polyol (VI) and the isocyanate resin (III). When tetrazole polyol is alkylated tetrazole polyol, the alkylated tetrazole polyol includes tri-alkylated tetrazole polyol. When tetrazole polyol is alkylated tetrazole polyol, the alkylated tetrazole polyol includes tetra-alkylated tetrazole polyol. When tetrazole polyol is arylated tetrazole polyol, the arylated tetrazole polyol includes tri-arylated tetrazole polyol. When tetrazole polyol is arylated tetrazole polyol, the arylated tetrazole polyol includes tetra-arylated tetrazole polyol. In other embodiments, [p] of the linear polymers are about 5 to about 1,000.

Embodiments of the present invention include a polymer having the general structure (VII) comprising: wherein [p] is a value of about 5 to about 10,000; wherein [m] is a value of 2 to 9;

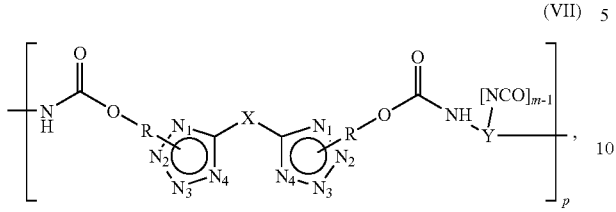

wherein [X] comprises at least one group of alkyls, aryls, and oligoethers; wherein [R] comprises at least one group of alkyls, aryls, and oligoethers, wherein [R] is chemically bonded to $N_1$ or $N_2$ position; and wherein [Y] comprises at least one group of alkyls, aryls, and oligoethers.

Other embodiments of the present invention include a process for preparation of a polymer having the general structure (VII) comprising: an effective amount of tetrazole diol having the

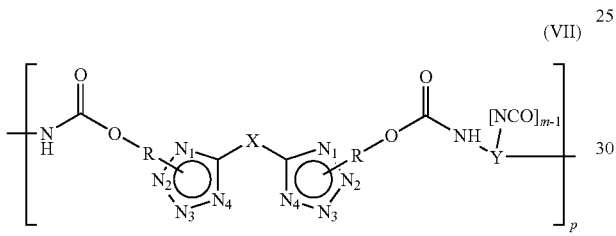

general structure (II) reacting with isocyanate resin at a temperature in the range of about 50° C. to about 100° C. for a time period in the range of about 1 to about 48 hours, wherein [X] of the tetrazole diol comprises at least one group of alkyls, aryls, and oligoethers, wherein [R] comprises at least one group of alkyls, aryls, and oligoethers, wherein [R] is chemically bonded to $N_1$ or $N_2$ position; wherein the isocyanate resin having the general structure (VIII), wherein [Y] comprises at

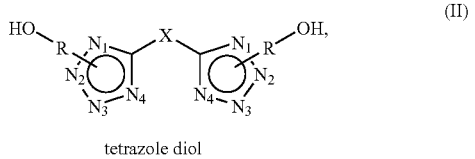

tetrazole diol least one group of alkyls, aryls, and oligoethers, wherein [m] is 2-9, cooling to room temperature producing a linear polyisocyanate polymer; and the linear polyisocyanate polymer having the

general structure (VII), wherein [X] comprises at least one group of alkyls, aryls, and oligoethers, wherein [Y] comprises at least one group of alkyls, aryls, and oligoethers, wherein [m] is 2 to 9, wherein [p] is about 5 to about 10,000, wherein [R] comprises at least one group of alkyls, aryls, and oligoethers, wherein [R] is on $N_1$ or $N_2$ of position the linear polyisocyanate polymer (VII).

When tetrazole diol is alkylated tetrazole diol, the alkylated tetrazole diol includes di-alkylated tetrazole. When tetrazole diol is arylated tetrazole diol, the arylated tetrazole diol includes di-arylated tetrazole diol or an oligoether tethered diol. In other embodiments, [p] of the linear polymers are about 5 to about 1,000.

EXPERIMENTAL RESULT

Tetrafunctional Tetrazole with Trifunctional Isocyanate

In a glass vial equipped with a stir bar, tetra tetrazole (500 mg), tri functional isocyanate (Tolunate LV) (500 mg), and triphenyl bismith catalyst (50 mg) were combined and stirred at 60° C. for 12 hours, to yield an off-white rubbery foam. The solid was analyzed by DSC.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A polymer of structure (I):

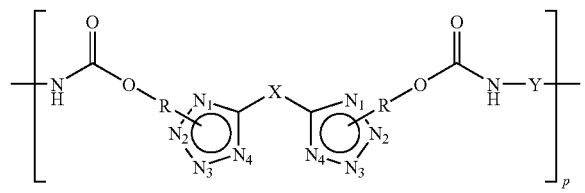

wherein "p" is a value from about 5 to about 10,000;
wherein "X" is an alkyl group;
wherein "R" is an alkyl group, wherein "R" is chemically bonded to $N_1$ or $N_2$ position; and
wherein "Y" is an alkyl group.

2. The polymer according to claim 1, wherein said "p" of said polymer is about 5 to about 1,000.

3. A polymer of structure (I) produced by the process comprising:

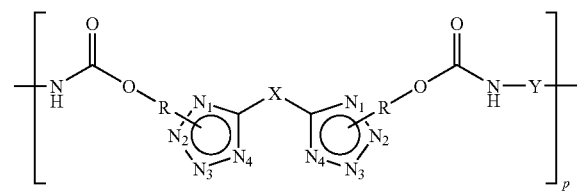

wherein "X" is an alkyl group, wherein "R" is an alkyl group, wherein "R" is chemically bonded to $N_1$ or $N_2$ position;

reacting an isocyanate resin with an effective amount of tetrazole diol of structure (II),

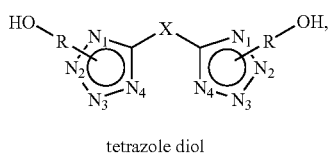

tetrazole diol wherein "X" is an alkyl group, wherein "R" is an alkyl group, wherein "R" is chemically bonded to $N_1$ or $N_2$ position, at a temperature from about 50° C. to about 150° C. for about 1 hour to about 24 hours, wherein said isocyanate resin of structure (III), wherein "Y" is an alkyl group,

OCN—Y—NCO     (III);

cooling to room temperature; and, extracting a linear polyisocyanate polymer of structure (I), wherein "X" is an alkyl group, wherein "Y" is an alkyl group, wherein "p" is about 5 to about 10,000, wherein "R" is an alkyl group, wherein "R" is chemically bonded to $N_1$ or $N_2$ positioned of said linear polyisocyanate polymer (I).

4. The polymer according to claim 3, wherein said "p" of said linear polyisocyanate polymer is about 5 to about 1,000.

5. The polymer according to claim 3, further comprises combining at least one catalyst and filler together with said tetrazole diol (II) and said isocyanate resin (III).

6. The polymer according to claim 3, wherein said tetrazole diol is alkylated tetrazole diol, said alkylated tetrazole diol includes di-alkylated tetrazole.

7. The polymer according to claim 3, wherein said tetrazole diol is arylated tetrazole diol, said arylated tetrazole diol includes di-arylated tetrazole.

8. The polymer according to claim 1 or claim 3, wherein "X" is $CH_2$.

* * * * *